United States Patent [19]

Jenstrom et al.

[11] Patent Number: 4,818,629
[45] Date of Patent: Apr. 4, 1989

[54] JOINT CONSTRUCTION FOR LINED EQUIPMENT

[75] Inventors: Einar R. Jenstrom, Waukegan, Ill.; Mortimer Schussler, Titusville, Fla.

[73] Assignee: Fansteel Inc., North Chicago, Ill.

[21] Appl. No.: 769,263

[22] Filed: Aug. 26, 1985

[51] Int. Cl.$^4$ .............................................. B32B 15/04
[52] U.S. Cl. .................................... 428/594; 428/614; 428/662; 428/675; 428/677; 228/165
[58] Field of Search ............... 428/594, 662, 677, 681, 428/675, 614; 228/165, 175, 184, 189; 285/286; 403/271, 272

[56] References Cited

U.S. PATENT DOCUMENTS

| | | | |
|---|---|---|---|
| 1,779,902 | 10/1930 | Davies | 285/286 |
| 1,981,850 | 11/1934 | Fischer | 285/286 |
| 2,209,290 | 7/1940 | Watts | 228/226 |
| 2,659,966 | 11/1953 | Turnbull | 285/286 |
| 3,137,937 | 6/1964 | Cowan et al. | 228/109 |
| 3,233,312 | 2/1966 | Cowan et al. | 428/614 |
| 3,365,786 | 1/1968 | Takemura et al. | 29/446 |
| 3,443,306 | 5/1969 | Meyer | 228/165 |
| 3,592,639 | 7/1971 | Schussler | 420/427 |
| 3,596,793 | 8/1971 | Kochen | 220/63 R |
| 3,733,686 | 5/1973 | Maucher | 228/189 |
| 4,030,848 | 6/1977 | Keifert et al. | 228/165 |
| 4,030,849 | 6/1977 | Keifert et al. | 228/165 |
| 4,032,243 | 6/1977 | Keifert et al. | 403/272 |
| 4,073,427 | 2/1978 | Keifert et al. | 228/165 |
| 4,459,062 | 6/1984 | Siebert | 228/165 |
| 4,510,171 | 4/1985 | Siebert | 228/165 |

FOREIGN PATENT DOCUMENTS 16490 9/1966 Japan ................................ 228/190

Primary Examiner—John J. Zimmerman
Attorney, Agent, or Firm—Barnes, Kisselle, Raisch, Choate, Whittemore & Hulbert

[57] ABSTRACT

A joint construction is provided for lined equipment in which mutually weldable backing plates or sheets are lined with layer or facing sheets weldable to each other but not to the backing. An intermediate metal is optionally included between the backing and layer. A channel is provided between the layer sheets overlying the joint between the backings. A bridging strip weldable to the layer sheets is disposed in the channel and welded to the respective edges of the layer sheets. In some embodiments spaced strips of the layer material are disposed under the respective edges and the bridging strip and welds are made to join the spaced strips, the bridging strip and the edges of the layer sheets.

21 Claims, 2 Drawing Sheets

JOINT CONSTRUCTION FOR LINED EQUIPMENT

FIELD OF THE INVENTION

This invention covers an improved wall assembly and method of construction of joints for the fabrication of industrial equipment that has walls comprised of two or more layers of material, especially for chemical process equipment.

BACKGROUND AND OBJECTIVES OF THE INVENTION

The method relates to improvements in welded joints in equipment in which a surface layer of a special purpose metal or alloy, such as a metal with excellent corrosion resistance, is used in conjunction with a backing of a more common base metal. The method is versatile, and is adaptable to wall constructions wherein the special purpose metal either is or is not bonded to the backing. The composite wall construction thus has the structural strength of the backing material and the corrosion resistance or other useful property of the special metal at the clad or lined surface.

The improved method of fabrication described herein can be applied to an extremely large number of dissimilar metal combinations. Some of such combinations include: tantalum, niobium (columbium), vanadium, titanium, zirconium, or hafnium, or their alloys, as liners or layers on mild steel; tantalum or niobium layers on copper-base alloys; tantalum plus copper layers on mild steel; and tantalum layer on nickel or nickel-base alloys, or on cobalt-base alloys. The liner or layers of the special purpose metal or alloy may be bonded to the backing by techniques including roll bonding, explosive cladding (such as the Detaclad process, trademark of E. I. duPont de Nemours and Co., described in U.S. Pat. Nos. 3,137,937 and 3,233,312); and brazing, such as with silver brazing alloys; or the lining or facing may simply be in close contact with the backing, such as an unbonded, loose, or thermal-expansion compensated lining.

The use of a special purpose metal or alloy lining or facing on a more common base metal backing is well known in the state-of-the-art. However, methods for fabrication of such equipment present serious problems, especially at joints when the lining material is not generally "metallurgically compatible" with the backing material. An example of such metallurgical incompatibility is the case of utilizing a tantalum liner or layer on a mild steel backing. The melting points of these materials differ widely; tantalum melts at about 3000° C. (5430° F.) and mild steel at about 1530° C. (2790° F.). Mild steel has a coefficient of thermal expansion about twice that of tantalum. Iron and tantalum do not alloy to produce ductile alloys (the tantalum-iron phase system contains the brittle intermetallic compound $TaFe_2$ and eutectics between this compound and the very limited solid solubility, terminal solid solutions - See FIG. 11, p. 461, "Columbium and Tantalum", by F. T. Sisco and E. Epremian, published by John Wiley and Sons, Inc., (1963).

To overcome these metallurgical incompatibilities, U.S. Pat. No. 3,443,306 to Meyer, utilizes a copper interlayer (about 0.060-inch thickness) between the tantalum cladding and the steel base to serve as a heat dissipating layer during the welding procedures. In this patented method of weld assembly, the thickness of the copper layer is critical, and the copper intermediate layer must be integrally bonded to both the steel substrate and the outer tantalum layer. The final weld joint contains an outer projecting batten strap of tantalum which is joined by fillet welds to the underlying tantalum cladding. The fillet welds at the ends of the projecting batten strap cannot meaningfully be x-ray inspected for code weld quality, so techniques such as soap tests, helium leak tests with a mass spectrometer, or penetrant dye tests are used to monitor weld quality. While such tests can indicate that the initial weld is leak-tight, they do not provide assurance that an adequate depth of weld and weld penetration has been achieved to provide the necessary strength in the joint. Furthermore, the method of joint assembly does not provide provisions for accommodating the internal stresses caused by the differential thermal expansion between the steel and tantalum when the fabricated unit is heated to or cooled from the subsequent service conditions. Thus, such joints can be prone to failure during service from the stresses due to thermal cycling, as well as to fatigue cycling during service.

In joining sections of such composite clad materials, it is necessary to separately preserve the chemical purity and maintain the properties of the clad metal and of the backing metal in their respective weld joints. It is further desired that the welds in the clad metal and backing metal have complete penetration through their respective cross-sections. Additionally, the initial full cross-section thickness should be preserved in the final joints; i.e., the wall of the backing material (say, mild steel) should not be notched or grooved in the joint area. Furthermore, it is desired that the weld joints be capable of permitting inspection of weld quality, such as by x-ray radiography, as they are produced. Finally, it is desired that provisions be provided in the weld joint to compensate for the differences in thermal expansion between the base metal and clad metal to minimize the possibility of mechanical failure in service caused by thermal or oscillating (fatigue) stresses.

A number of variations in wall and joint constructions for dissimilar metal composites have been presented in the prior art. Some of these include the following United States patents:

2,209,290: Watts
4,032,243: Keifert et al
4,073,427: Keifert et al
4,510,171: Siebert All of these prior art patents are deficient with respect to at least one of the above-outlined desired characteristics or attributes in a dissimilar metal weld joint construction.

One principal object of the present invention is to provide a versatile method of fusion welded joint fabrication for equipment comprising a combination of a lining or facing of a special purpose metal or alloy, especially the refractory and reactive metals and their alloys, and a ferrous or non-ferrous base metal on which the lining or facing material may either be bonded or unbonded.

Another object is to provide a method of fabrication that will simplify and improve the fitup of both the backing and lining and facing in joining either bonded or unbonded equipment in which the wall is constructed of two or more layers.

An additional object is to provide a method of fabrication to produce sound, full penetration and contamination-free welds independently in the base metal and in the lining or facing, wherein the full cross-sectional thickness of both members are maintained, and, furthermore, to allow thorough, non-destructive testing to ensure high quality in the welds in sequence as they are completed.

A further object is to provide means in the joint fabrication to compensate for differences in thermal expansion of the base metal and lining metal. Thus, the possibilities of failures during subsequent service caused by induced thermal and mechanical stresses are minimized.

These and other objects provided by this improved joint construction and method of fabrication will be apparent to those skilled in the art by the following drawings and examples.

BRIEF DESCRIPTION OF THE DRAWINGS

DRAWINGS accompany the disclosure and the various views thereof may be briefly described as.

The figures and examples will be given as specific embodiments in which a tantalum material is employed as the lining or facing material and mild steel or other iron-base alloy as the backing material. Tantalum-lined chemical process equipment has been used in a number of chemical process applications where the tantalum lining provides corrosion resistance to the corrosive environment. But because of the hig cost of tantalum, thin liners or layers of this special purpose material are used to resist the corrosive conditions, and a low-cost base material, commonly mild or plain carbon steel, is used as the backing and principal structural member of the equipment. Such typical chemical process equipment includes bayonet heaters, heat exchangers, condensers, towers, columns and other vessels, piping, fitting and valves.

In the specific embodiments described in the examples, the lining is formulated of tantalum or a tantalum alloy such as Tantaloy "63" Metal manufactured by Fansteel Inc., which contains 2.5 weight percent tungsten, 0.15 weight percent niobium, with the balance being essentially tantalum as discussed in commonly assigned U.S. Pat. No. 3,592,639. Tantaloy "63" Metal has about 50 percent higher ultimate tensile strength and about twice the yield strength compared to unalloyed tantalum at a temperature of about 200° C. (390° F.), which is a typical process temperature in some chemical applications. This alloy generally shows at least equivalent corrosion resistance to pure tantalum in many environments.

While the lining materials described is tantalum or Tantaloy "63" Metal in the specific examples, it should be apparent to those skilled in the art that the methods of fabrication described in this invention can be equally well utilized when the lining material is any ductile, fabricable and weldable refractory or reactive metal, or their alloys, including niobium, vanadium, titanium, zirconium, hafnium, and alloys having these refractory or reactive metal bases.

Also, the specific embodiment and examples that are described cite mild steel as the structural backing material. Again, it should be apparent that backings of this invention can be other common base metals, such as other steels, including stainless steels, copper-base, nickel-base and cobalt-base materials, or can be a refractory metal or reactive metal, or their alloys, different from that of lining material.

EXAMPLE 1

Figure 1:
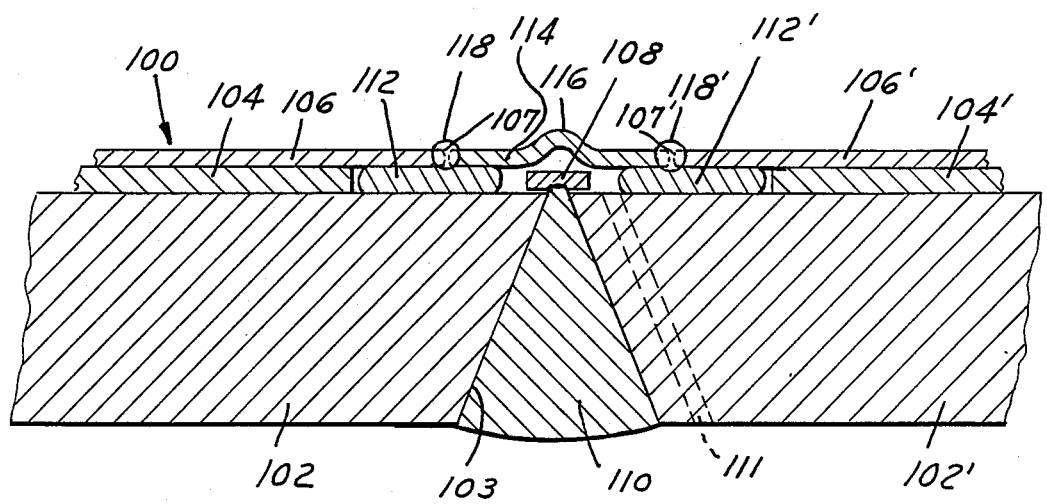
FIG. 1 shows cross-section of the wall assembly in one embodiment of this invention.

FIG. 1 shows a cross-section of a weld joint construction 100 for two symmetrical members having a three-layer wall. The mild steel backing or base metal 102 and 102' has, as an example, a 1-inch thickness. A 0.080-inch thick copper layer 104 and 104' is explosively bonded (Detaclad) to the mild steel base metal; and a 0.030 to 0.040-inch thick tantalum layer 106,106' is explosively bonded to the intermediate copper layer. The steel backing commonly ranges from one-quarter to one-inch thickness, but thinner or thicker steel backings are utilized in some cases, based on code requirements. The thickness of the intermediate copper layer generally ranges from 0.050 to 0.100-inch. The thickness of the tantalum layer generally ranges from 0.020 to 0.080-inch, although thinner or thicker layers can be utilized. Aside from handling and fabrication considerations and requirements, the thickness of the tantalum layer generally is governed by consideration of corrosion resistance and desired corrosion life of the equipment.

The first step in the joint fabrication is to machine the adjacent members flush and parallel to each other. Next, on each member the tantalum and copper are machined back a distance (typically about ½-inch, and more generally in the range of ⅜ to ¾-inch); then the copper layer is undercut below the tantalum layer an additional distance (typically about ½-inch, and more generally in the range of ⅜ to ¾-inch).

Next, the steel backing 102,102' is machined to provide a groove joint geometry 103 in accordance with "Recommended Proportions of Grooves for Arc Welding", Welding Handbook, Sixth Edition, Section 1, American Welding Society. The groove 103 has a taper upwardly, converging as viewed in the drawings, to a narrow root portion. Following solvent cleaning of the weld joint groove and surrounding area, a mild steel (or other metal compatible to the backing) backup strip 108 is placed as shown at the root of the two members and tack welded in proper location. This steel backup strip 108 is typically about 1/16-inch thickness (range of 0.040 to 0.125-inch) by ½-inch width (range of ¼ to ¾-inch width). In some joint constructions, the use of a backup is optional or not necessary, so in the broadest scope of this invention the use of a steel backup strip is optional. However, the steel backup strip serves a useful additional function later as a convenient locator for the tantalum backup strips 112 and 112', as described later.

Next, the steel fusion butt weld 110 is made, using a welding procedure in accordance with the recommended practice of the above-recited Welding Handbook in order to produce a code quality weld. The steel backup strip 108 optionally can be removed, and any excess weld metal then is machined to achieve a weld root flush with the base metal. Weld reinforcement on the exterior or face side of the steel weld may or may not be dressed down smooth with the outside surface of the steel base metal. Normally, the steel butt weld will be inspected for quality by x-ray radiography and other techniques, and any defective areas will be repaired before proceeding to the next step.

Next, purging holes 111 are drilled through the steel base metal adjacent weld 110. These holes are used to provide inert gas purging at the underside or root side of the welds to be made in the tantalum. These purging holes are normally left open even after completing the entire welded wall assembly since they then serve a second purpose of being used for leak detection of the fabricated equipment.

Adequate cleaning of the tantalum materials is mandatory in order to achieve high quality welds. All contaminants such as copper, steel chips, other metallics, oil or grease and other soils must be thoroughly removed by techniques such as machining, degreasing, and chemical cleaning. This precaution on cleanliness also applies to all materials in the channel locations where the tantalum backup strips 112 and 112' are to be positioned. The tantalum materials include the overlapping edges 107 and 107' of layers 106 and 106', backup strips 112 and 112', and inlay 114. The undercut edges of layers 106 and 106' are cleaned by thorough solvent degreasing and chemical cleaning immediately before welding. The backup strips and inlay in addition are chemically cleaned immediately before welding by pickling in an acid solution comprised of:

Nitric Acid (70%); 3 parts by volume (60% by volume)
Sulphuric Acid (95%); 1 part by volume (20% by volume)
Hydrofluoric Acid (48%); up to 1 part by volume (up to 20% by volume)

Following the acid pickling, the tantalum materials are removed from the acid solution and immediately immersed in clean water. The final water rinse is done with the water temperature about 50° C. (125° F.). Following the water rinsing, the materials are rinsed in alcohol followed by drip drying and wiping of the excess alcohol from the surface using a lint-free, clean white cloth.

The thickness of the tantalum backup strips 112 and 112' should generally be greater than that of layers 106 and 106', and inlay 114, and approximately match the thickness of the intermediate copper layer. Customary thicknesses of the backup strip typically range from about 0.060 to 0.100-inch. Widths typically range from about ½ to ¾-inch. The edges are rounded to avoid cutting into the layer and inlay. The tantalum backup strips 112 and 112' are positioned adjacent to and outboard of the steel backup 108, with a small gap between them. The undercut edges 107 and 107' of layers 106 and 106' are formed snugly against and partially overlap the backup strips 112 and 112', respectively. The width of tantalum inlay 114 is cut to snugly fit the gap between the edges of layers 106 and 106'. The edges 107, 107' of the layers 106, 106' can be said to be abutting prior to welding. The thickness of the inlay desirably should match that of the tantalum layer. The inlay 114 desirably contains at least one convolution 116, which serves to compensate for the differential in thermal expansion between the steel and the tantalum. A typical convolution in a 0.030-inch thick inlay has a width of about 0.100 to 0.400-inch, height of 0.050 to 0.150-inch, and is formed using generous radius tooling.

Tantalum materials can be successfully fusion welded using techniques such as inert gas shielded tungsten arc welding, or electron beam welding. The inert gas shielded tungsten arc welding, also called TIG or GTA welding, is the most commonly used procedure, and is used in the embodiment described. The region of the tantalum alloy material to be welded is evacuated and purged with an inert gas, generally argon, but the inert gas can be any one or a mixture of inert monatomic gases such as argon, helium, neon, krypton or xenon.

If feasible, the entire assembly to be welded can be placed in a chamber which is evacuated and back filled with an inert gas. Alternately, a plastic bag or sheet can be taped to the liner or facing of both members. A hose is fitted into the bag to inflate and purge the bag and the areas to be welded. An additional hole in the bag permits any residual air to exit, and the flow of inert gas is continuous so as to purge out any residual contaminants.

The inert gas should be used to purge the root side of the weld in the tantalum layers. The welding torch is inserted into an additional hole in the bag to make the weld in the tantalum material.

The procedure can be used to generate a good quality, complete penetration butt weld in the tantalum material facing layer. It is especially important in making the weld in tantalum material to be sure there is no contamination on the tantalum material anywhere in the vicinity of the area heated by the welding torch.

The tantalum facing sheets are TIG welded to the inlay and backup strips in an inert gas purged chamber to produce the welds 118 and 118' with a weld contour, in cross-section, as indicated in FIG. 1. If required, additional filler material of the same composition as the tantalum components may be added when making the fusion butt welds.

The tantalum welds are examined by penetrant dye inspection and x-ray radiography for the presence of any defects in the weld. Any defective area, if found, should be repaired and inspected again in order to ensure the achievement of high quality welds in the finished wall assembly. All welds are found to be sound and defect-free.

EXAMPLE 2

Figure 2:
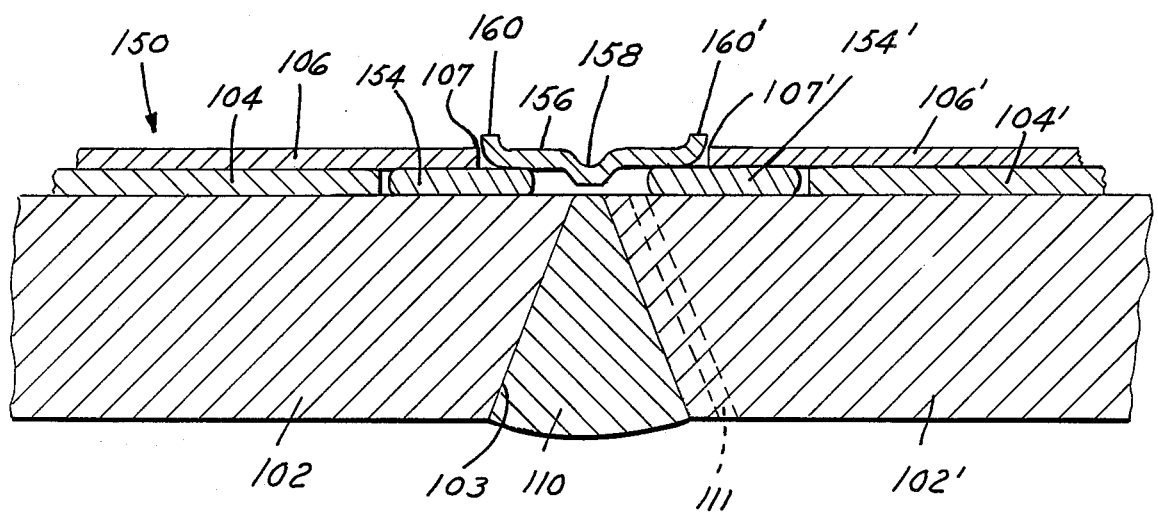
FIG. 2 shows another embodiment showing a cross-section of a partially welded wall assembly.

Another improved wall assembly 150 is shown in the partially welded cross-section of FIG. 2. The adjacent edges of the two sections to be joined are prepared as described in Example 1. The parallel faces of the backing 102 and 102' (nominally 1-inch thick mild steel) are prepared for welding. The edges of the explosively clad or bonded intermediate layer 104 and 104' (nominally 0.080-inch thick copper) and outer clad layer 106 and 106' (nominally 0.030 to 0.040-inch thick tantalum) are cut back a distance, and the edges of the intermediate layer are undercut a further distance below the outer clad layer as described in Example 1.

The edges of the backing are welded as described in Example 1 to produce weld 110. Howver, no steel backup strip is used. Optionally a steel backup can be used, then be removed after weld 110 is made. Then the quality of the weld 110 is inspected as described previously. Purging holes 111 are drilled through the steel base metal adjacent weld 110.

After cleanup of the area where the tantalum welds are to be made, chemically clean tantalum backup strips 154 and 154' and inlay 156 are positioned. The inlay, which has a thickness essentially equivalent to the prepared facing layer, is preformed to contain at least one inwardly projecting corrugation 158 and outwardly projecting lips 160 and 160', and to fit snugly in the gap between the edges 107 and 107' of facing 106 and 106'. Here again, as in the description of FIG. 1, the upturned edges 160,160' can be said to be abutting. The edges 160,160' are upturned to be essentially transverse of the general plane of inlay 156. This upturn provides good fitup and also weld filler material. A tantalum weld is made under inert gas protection, as previously described, to fuse the projecting lip 160 to joint it to facing 106 and backup strip 154 on the left side; and another similar weld is made to join melted down lip 160', facing 106', and backup strip 154' on the right side, completing the welded wall assembly. These tantalum welds, in cross-section, have a smooth oval contour with good weld penetration similar to welds 118 and 118' depicted in Example 1.

EXAMPLE 3

Figure 3:
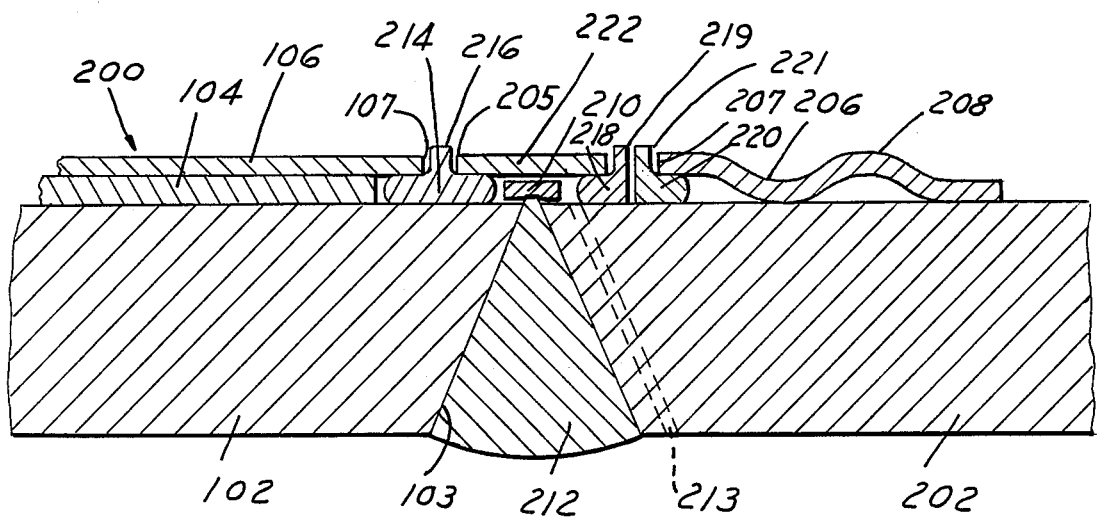
FIG. 3 shows the cross-section of another partially welded wall assembly.

The partially welded cross-section of the wall assembly 200 in FIG. 3 depicts a member comprised of backing 102 (i.e. mild steel) with an explosively bonded intermediate layer 104 (i.e. copper) and an outer explosively bonded cladding or facing 106 (i.e. tantalum) on the left side partially joined to a member comprised of a backing 202 (i.e. mild steel) with an unbonded facing layer 206 (i.e. tantalum) on the right side. The adjacent edges of the members are prepared by machining them smooth and parallel each other. The intermediate and facing layers 104 and 106 are cut back a distance from the edge of the backing, and the intermediate layer 104 is undercut an additional distance beneath the facing layer 106 on the left side. On the right side, the facing layer 206 (or lining) may or may not be installed at this time, and has an unattached edge 207. The edge 207 is recessed a distance back from the edge of the steel backing 202. This permits ease in making and inspecting the steel weld, and yet allows the unbonded member on the right to be preassembled. The facing layer 206 also has a number of longitudinal extending convolutions 208 to serve as a means to compensate for the differential thermal expansion of the steel backing and tantalum facing when the completed unit is heated to and cooled from the subsequent service temperature.

The adjacent edges of backing 102 and 202 are prepared for welding. A steel backup strip 210 is positioned and tack-welded in place. Then steel weld 212 is made and inspected for quality. The backup strip is optionally left in place or removed flush to the root side of the weld. Then purging holes 213 are machined.

After cleaning the area where the tantalum weld is to be made, a tantalum backup piece 214 with an inverted T-shape in cross-section is positioned adjacent to steel backup 210. The projecting end 107 of facing 106 is assembled against the left side of leg (root) 216 of the T-shaped backup 214. Then two L-shaped backup pieces 218 and 220, with vertical projecting legs (roots) 219 and 221, respectively, are installed with the edge 207 of facing layer 206 overlapping backup piece 220 and abutting leg (root) 221. Next, a tantalum inlay strip 222 having an edge 205 is placed to overlap backup 214 and abut leg (root) 216 on the left side, and an opposite edge to overlap backup 218 and abut leg (root) 219 on the right side. One tantalum weld is made under inert gas protection to melt down the vertical leg (root) 216 of backup 214, thus joining facing 106 and inlay 222 to backup 214. Similarly, another tantalum weld is made to melt down legs (roots) 219 and 221, and join inlay 222 and facing 206 to backups 218 and 220. This construction results in the two L-shaped backups 218 and 220 serving similar to the T-shaped backup 214, and both methods can be considered essentially equivalent in the final assembly. The resulting welds are oval in shape when viewed in cross-section, have good weld penetration, and are similar in appearance to welds 118 and 118' of Example 1.

The two L-shaped backup pieces 218 and 220 form together a T-shaped backup. Making the backup of two pieces sometimes facilitates the introduction of the backups.

EXAMPLE 4

Figure 4:
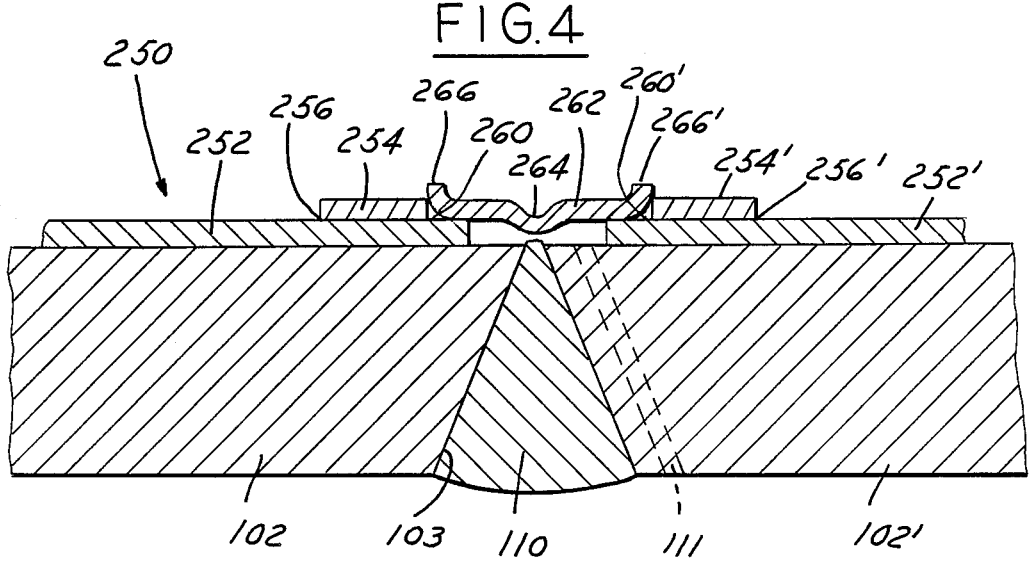
FIG. 4 shows the cross-section of another partially welded wall assembly.

The cross-section of FIG. 4 shows a partially welded wall assemby 250 produced from two members. The left hand member has a backing 102 (i.e. mild steel) with an explosively bonded facing 252 (i.e. tantalum). In addition, an overlay strip 254 (i.e. tantalum) is explosively bonded to facing 252 along junction 256. The initial thickness of the overlay strip is typically about the same as that of the bonded facing, but can range from about 0.030 to 0.080-inch, and can be greater, if desired. The width of the overlay strip can be any desired width, but typically is in the range of about 1 to 2 inches. Explosive bonding of tantalum overlay strips on tantalum clad steel was performed by Explosive Fabricators, Inc. Material with such overlay strips was utilized in this embodiment of the invention.

The right hand member is symmetrical to the left hand member in this example; it is comprised of a corresponding backing 102' with an explosively bonded facing layer 252' and an explosively bonded overlay strip 254'.

The adjacent edges of the members are machined parallel each other. The overlay strips 254 and 254' are machined to produce a channel with the configurations 260 and 260'. Then the steel backings 102 and 102' are prepared for welding. A steel weld 110 is made and inspected. Next, purging holes 111 are machined together the steel backup adjacent the weld.

The area on and between the tantalum overlay strips 254 and 254' is cleaned. Then a performed and chemically clean inlay 262 (i.e. tantalum) containing at least one convolution 264 and projecting lips 266 and 266' is assembled snugly in the channel contours 260 and 260' in the overlay strips 254 and 254'. The lips 266 and 266' are formed to extend essentially transversely to the plane of the inlay strip 262 to provide good fitup and also weld filler metal. One tantalum weld is made under inert gas protection to joint inlay 262 to overlay strip 254 on the left side, and a second weld similarly is made to join inlay 262 to overlay strip 254' on the right side. When viewed in cross-section, these welds have a good contour and weld penetration, with an appearance typical of high quality butt welds made in tantalum.

Optionally in this embodiment, an intermediate layer of copper could also be utilized between the explosively bonded facing 252,252' and the backing 102,102'. In this case, the copper is utilized as an aid in sheet preparation prior to the explosive cladding, and does not enter into the weld process.

It is apparent that the features of the examples can be used in other ways and combinations that achieve equivalent results. Thus, projecting lips can be used on the inlays to provide filler weld metal, as can the legs of inverted T-shaped backup strips in any of the examples. Other shapes suitable for the thermal expansion compensating function served by the illustrated convolutions can be used, such as sine wave shapes, bellows shapes, formed or welded V-shapes, U-shapes, loop-shapes and others.

Wall assemblies where both members that are to be joined comprise a backing and an unbonded facing layer can utilize the joint construction of any of the examples.

Fabrication of wall constructions of this invention has been illustrated by using specific types of materials by way of examples, but the wall construction is not limited since the materials and wall constructions described can be applied to a broad spectrum of materials as covered by the claims.

We claim:

1. A wall assembly comprising:
   (a) abutting edges of a composite wall of a first metallic material, an intermediate layer of a second metallic material, and a third layer of a third metallic material, with one face of the first and third metallic materials in a face-to-face relation with a face of the second metallic material, and with the third metallic material not being directly weldable to the first metallic material,
   (b) a channel formed in an area adjacent the edges of the third layer and the intermediate layer, and further extending into the intermediate layer underlying the third layer,
   (c) a groove formed in the first metallic material at the abutting edges,
   (d) a weld in said groove joining the first material material, said first metallic material being of uniform thickness on opposing sides of said weld under said channel and beneath edges of said intermediate and third layers separated by said channel,
   (e) separate backup strip means of the third metallic material spaced laterally from each other and located at the respective sides of said channel overlying said first metallic material, and partially underlying the third layer in the channel formed in the intermediate layer, said backup strip means having a thickness substantially equal to thickness of said intermediate layer and having opposed edges laterally spaced from each other by a distance which is less than that separating said edges of said third layer,
   (f) an inlay strip of the third metallic material with edges positioned on said backup strip means, bridging said channel and abutting the edges of the layer of third metallic material in said channel, said inlay strips having a longitudinally extending convolution for acommodating lateral thermal expansion, and
   (g) welds joining the abutting edges of the inlay strip and said layer of third metallic material to the backup strip means of third metallic material.

2. A wall assembly according to claim 1 wherein there is a backup strip of a metallic material, compatible to the first metallic material, welded to the first metallic material in said channel at the root of said groove between said opposed laterally spaced edges of said backup strip means.

3. A wall assembly according to claim 1 wherein said convolution projects into said channel between said opposed laterally spaced edges of said backup strip means.

4. A wall assembly according to claim 1 wherein said convolution projects outwardly away from said channel.

5. A wall assembly according to claim 1 wherein the third metallic material is selected from metals comprising tantalum, niobium, vanadium, titanium, zirconium and hafnium, and their alloys.

6. A wall according to claim 1 wherein the third metallic material is tantalum.

7. A wall assembly according to claim 1 wherein the second metallic material is copper.

8. A wall assembly according to claim 1 wherein the first metallic material is selected from an iron-base, nickel-base and cobalt-base alloy.

9. A wall assembly according to claim 1 wherein the first metallic material is mild steel.

10. A wall assembly according to claim 1 with purging holes extending through the first metallic material.

11. A wall assembly comprising:
    (a) abutting edges of a composite wall of a first metallic material in a face-to-face relation with a facing layer of a second metallic material, overlay strips of said second metallic material bonded in a face-to-face relation to a portion of the other face of the facing layer of said second metallic material, the second metallic material not being directly weldable to the first metallic material,
    (b) a channel formed in an area adjacent the edges of said facing layer and said overlay strips of said second metallic material, with laterally opposed edges of said facing layer being separated from each other by a distance which is less than spacing between laterally opposed edges of said overlay strips,
    (c) a groove formed in the first metallic material at the abutting edges,
    (d) a weld in said groove joining the edges of said first metallic material,
    (e) an inlay strip of the second material positioned in said channel against said facing layer to abut said laterally opposed edges of said overlay strips of said second metallic material and to bridge the channel, said inlay strip having a longitudinally extending convolution for accommodating lateral thermal expansion, and
    (f) welds joining the edges of said inlay strip to said laterally opposed edges of said overlay strips of second metallic material.

12. A wall assembly according to claim 11 wherein there is a backup strip of a metallic material, compatible to the first metallic material, welded to the first metallic material in said channel at the root of said groove.

13. A wall assembly according to claim 11 wherein said convolution projects into said channel between said laterally opposed edges of said facing layer.

14. A wall assembly according to claim 11 wherein said convolution projects outwardly away from said channel.

15. A wall assembly according to claim 11 wherein the second metallic material is selected from metals comprising tantalum, niobium, vanadium, titanium, zirconium and hafnium, and their alloys.

16. A wall assembly according to claim 11 wherein the second metallic material is tantalum.

17. A wall assembly according to claim 11 which also includes an intermediate metallic layer in a face-to-face relation to a face of the first metallic material and the second metallic material.

18. A wall assembly according to claim 17 wherein the intermediate metallic layer is copper.

19. A wall assembly according to claim 11 wherein the first metallic material is selected from an iron-base, nickel-base and cobalt-base alloy.

20. A wall assembly according to claim 11 wherein the first metallic material is mild steel.

21. A wall assembly according to claim 11 with purging holes extending through the first metallic material.

* * * * *